(12) United States Patent
Sarbalkan et al.

(10) Patent No.: US 12,343,828 B2
(45) Date of Patent: Jul. 1, 2025

(54) UNIVERSAL SUPPORTING MEMBER FOR WIND TURBINE BLADE

(71) Applicant: TPI Composites, Inc., Warren, RI (US)

(72) Inventors: Gokhan Sarbalkan, Izmir (TR); Mustafa A. Dalgic, Izmir (TR)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/535,205

(22) Filed: Nov. 24, 2021

(65) Prior Publication Data

US 2022/0161375 A1  May 26, 2022

Related U.S. Application Data

(60) Provisional application No. 63/118,363, filed on Nov. 25, 2020.

(51) Int. Cl.
*B23P 15/02* (2006.01)
*B25B 11/00* (2006.01)

(52) U.S. Cl.
CPC .............. *B23P 15/02* (2013.01); *B25B 11/00* (2013.01)

(58) Field of Classification Search
CPC .......... B23P 15/02; B25B 11/00; Y02E 10/72; Y02P 70/10; F03D 13/40
USPC .................................................. 269/266, 21
See application file for complete search history.

(56) References Cited

U.S. PATENT DOCUMENTS

| | | | | |
|---|---|---|---|---|
| 4,088,312 A * | 5/1978 | Frosch | .................. | B25B 11/005 269/21 |
| 5,427,363 A * | 6/1995 | Rink | ..................... | B23B 31/307 269/21 |
| 7,125,010 B2 * | 10/2006 | Moore | ................... | B23Q 1/035 269/21 |
| 7,178,227 B2 * | 2/2007 | Ghuman | ............... | B62D 65/02 29/559 |
| 7,416,176 B2 * | 8/2008 | Hamann | ............... | B23Q 1/035 269/21 |
| 7,866,642 B2 * | 1/2011 | McAllister | ............ | B23Q 1/035 269/910 |
| 7,918,440 B2 * | 4/2011 | Schiavi | .................. | B23Q 1/035 269/304 |

(Continued)

FOREIGN PATENT DOCUMENTS

| | | |
|---|---|---|
| CN | 208396870 U | 1/2019 |
| CN | 210286476 U | 4/2020 |
| WO | WO-2020/207548 A1 | 10/2020 |

OTHER PUBLICATIONS

International Search Report and Written Opinion for International Application No. PCT/US2021/060760 dated Mar. 4, 2022.

*Primary Examiner* — Eric J Rosen
*Assistant Examiner* — Christopher Soto
(74) *Attorney, Agent, or Firm* — Stephen J. Kenny; Foley Hoag LLP (57) ABSTRACT

An automatically adjustable universal wind turbine blade handling apparatus including a rigid frame supporting a base plate and a plurality of adjustable support members. The support members are spaced from each other and include a vertical pillar, a moveable shaft that can be telescopingly extended or retracted, and a pivotable pad coupled to shaft. The plurality of support members are automatically adjusted to position the pad at predetermined heights and/or angles to accommodate a variety of blade types/sizes.

20 Claims, 8 Drawing Sheets

(56) References Cited

U.S. PATENT DOCUMENTS

| | | | |
|---|---|---|---|
| 8,079,578 B2* | 12/2011 | Bumgarner | B23Q 1/035 |
| | | | 269/21 |
| 8,469,345 B2* | 6/2013 | Samac | B23Q 3/06 |
| | | | 269/21 |
| 9,327,374 B1* | 5/2016 | McCulloch | B23Q 3/062 |
| 9,522,626 B2* | 12/2016 | Hansen | B60P 3/40 |
| 9,776,329 B2* | 10/2017 | Kai | B25J 9/104 |
| 10,259,690 B2* | 4/2019 | Franke | B66C 1/108 |
| 10,710,203 B2 | 7/2020 | Lin et al. | |
| 10,717,161 B2* | 7/2020 | Tezuka | B23Q 16/02 |
| 2014/0353894 A1* | 12/2014 | DesJardien | B64F 5/10 |
| | | | 269/21 |

* cited by examiner

UNIVERSAL SUPPORTING MEMBER FOR WIND TURBINE BLADE

CROSS REFERENCE TO RELATED APPLICATIONS

This application claims the benefit of priority under 35 USC 119 to U.S. Provisional Application No. 63/118,363 filed Nov. 25, 2020, the entire contents of which is hereby incorporated by reference.

BACKGROUND OF THE DISCLOSED SUBJECT MATTER

Field of the Disclosed Subject Matter

The disclosed subject matter relates to a wind turbine rotor blade handling system and apparatus for supporting a wind turbine rotor blade. Particularly, the present disclosed subject matter provides a universal saddle with adjustable supports to receive any blade configuration (size, shape, weight) and is positioned underneath the blade, at multiple locations along the blade span, thereby permitting surface treatment (e.g. sanding, painting, etc.) on the exposed blade surface.

Description of Related Art

A variety of methods and systems are known for use in the manufacturing process of wind turbine blades, including carts acting to support a section of the wind turbine blade, e.g. after removal from the blade mold, and during post molding operations e.g. external blade surface grinding or coating operations.

Conventional blade carts comprise an enclosed ring structure which is fitted around the body of the blade. However, as blade dimensions increase, these carts are typically difficult to mount to the blade. Often times a crane is required to support the blade weight while the cart is moved (often manually) along the blade. In addition, the cart presents a hazard during post molding operations where people and equipment are hindered by the large ring, and prevented from easily accessing the blade leading and trailing edges at the location of the cart.

Also, conventional blade carts are configured with closed brackets forming a closed ring into which the wind turbine blade is introduced. Not only is inserting the blade into these carts difficult and hazardous, the ring surrounds the upper and lower surfaces of the blade (as well as leading/trailing edge(s)) which prohibits access to the blade for surface treatment at those locations.

Some exemplary conventional blade handling systems are disclosed in WO 2013092597, WO 2012048719, US 20140356113, EP 2584191, JP2010216317, each of which is hereby incorporated by reference it its entirety, including the particular blade contacting elements and relative range of motions disclosed. As evident from the related art, conventional methods often require complex equipment, which is dedicated to a single blade type/size.

Thus, the present disclosure addresses these shortcomings of conventional designs by providing a universal apparatus that is adjustable to accommodate any blade type/size, minimizes hazards (to employees and blade damage), and allows for additional finishing processes to be performed while the blade is mounted on the support.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade handling apparatus comprising: a frame including a plurality of struts and a plurality of downwardly extending legs; a base plate having a generally rectangular shape and coupled to the frame along opposing sides; a plurality of adjustable support members disposed on the base plate; with each support member having: a pillar with a top surface and a bottom surface coupled to the base plate, and a moveable shaft having a first end and a second end, with the first end disposed at least partially within the pillar and the second end disposed above the top surface of the pillar, and a moveable pad, the pad coupled to the second end of the shaft.

In some embodiments, the shaft can be extended and retracted relative to the pillar and/or can rotate about a vertical axis. In some embodiments, the pad is pivotably attached to the shaft with a pin so that the pad can rotate about the axis of the pin.

In some embodiments, the adjustable support members are spaced apart with a fixed distance between each support, or alternatively, the adjustable support members are positioned on the base plate with a variable distance between each support.

In some embodiments, the pillar is a rectangular column, the shaft is a cylindrical rod telescopingly received within the pillar, and the pad is a rectangular structure oriented perpendicularly to the shaft. In some embodiments, each support member is independently adjustable. The support members can be adjustable via hydraulic and/or pneumatic power.

In accordance with another aspect of the disclosure, an automatically adjustable wind turbine blade handling apparatus is provided which comprises: a frame including a plurality of struts and a plurality of downwardly extending legs; a base plate having a generally rectangular shape and coupled to the frame along opposing sides; a plurality of adjustable support members disposed on the base plate; with each support member having: a pillar with a top surface and a bottom surface coupled to the base plate, a moveable shaft having a first end disposed at least partially within the pillar and a second end disposed above the top surface of the pillar, and a moveable pad coupled to the second end of the shaft; wherein a plurality of support members are automatically adjusted to position the pad at predetermined heights.

In some embodiments, a plurality of support members are automatically adjusted to position the pad at predetermined pitch angle. In some embodiments, the predetermined height of a first pad is different than the predetermined height of an adjacent pad. In some embodiments, the plurality of pads are positioned relative each other to compliment the contour of a wind turbine blade surface.

In some embodiments, the adjustable support members are spaced apart with a fixed distance between each support. In some embodiments, the pillar is a rectangular column, the shaft is a cylindrical rod telescopingly received within the pillar, and a bottom surface of the pad is a rectangular structure oriented perpendicularly to the shaft.

In some embodiments, the pillar has a height equal to or greater than the height of the shaft. In some embodiments, the frame has a rectangular upper surface, and base plate is positioned above the frame upper surface with a gap defined therebetween.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The apparatus presented herein provides a universal structure that is adjustable to accommodate any wind turbine blade type and/or size, minimizes hazards (to employees and blade damage), and allows for additional finishing processes to be performed while the blade is mounted on the apparatus. Furthermore, the apparatus can be positioned at any location along the span of the blade from root to tip. Thus the present disclosure provides a blade support apparatus that can be automatically operated (thereby reducing risk in injury/damage); avoids the burden of having an inventory of different saddle designs for each blade type; shortens product life cycle by eliminating need to change blade-specific tooling/apparatus; avoids the need for a forklift to support blade.

For purpose of explanation and illustration, and not limitation, an exemplary embodiment of the system in accordance with the disclosed subject matter is shown in FIGS. 3-9 and is designated generally by reference character 1000. Similar reference numerals (differentiated by the leading numeral) may be provided among the various views and Figures presented herein to denote functionally corresponding, but not necessarily identical structures.

Figure 1:
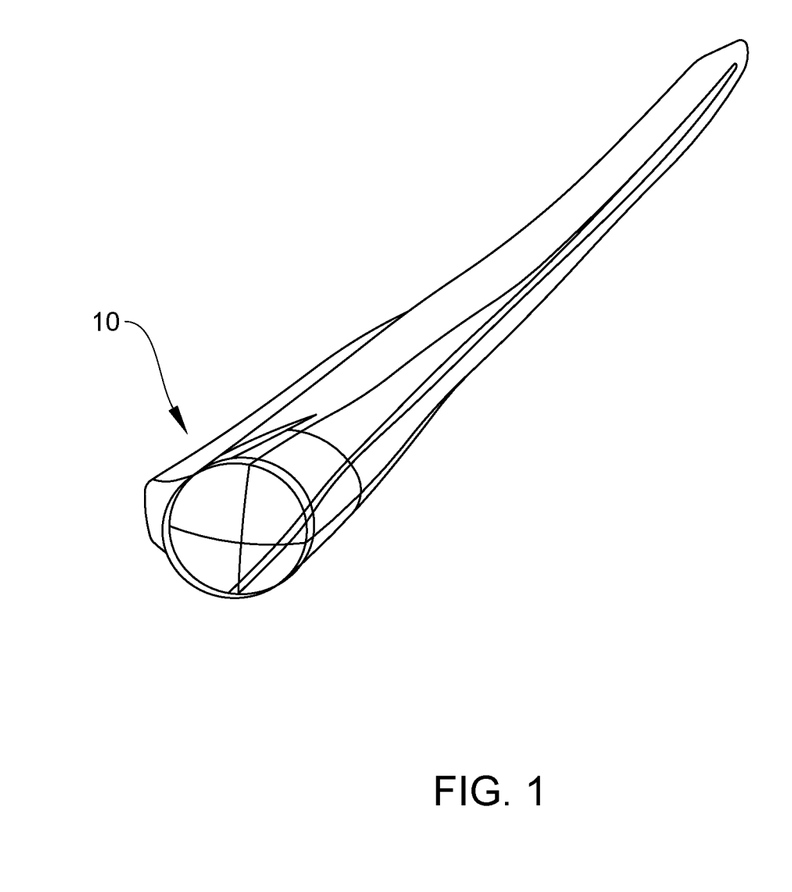
FIG. 1 is a schematic representation of a wind turbine blade in accordance with the disclosed subject matter.
Figure 2:
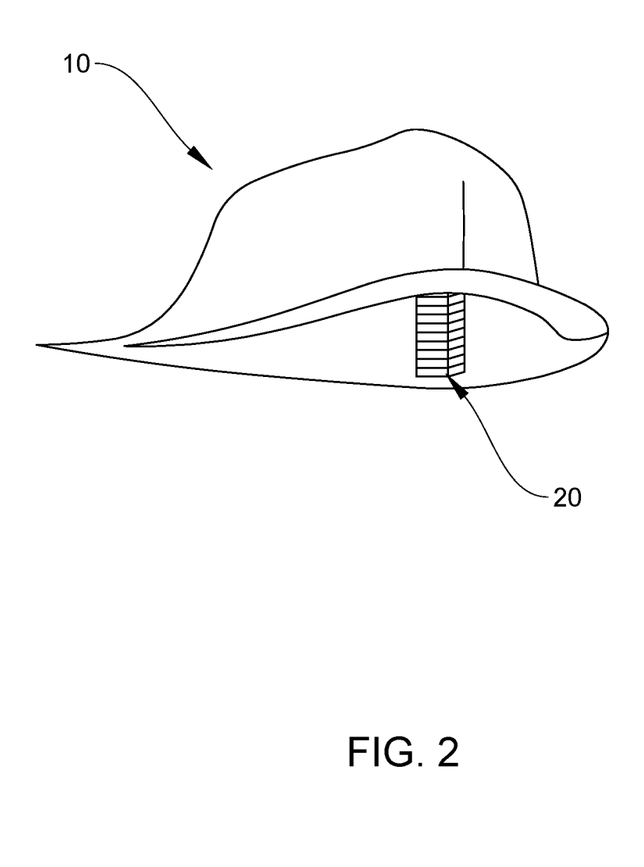
FIG. 2 is a partial cut-view of the tip of the blade shown in FIG. 1, depicting the shear web disposed between the upper and lower halves or "skins" of the blade.

As shown in FIGS. 1-2, a wind turbine blade 10 has a generally circular root section and airfoil shaped tip. The blade is typically formed as two shell halves, in separate molds which are then rotated closed in a clamshell fashion (e.g. rotated about the trailing edge) to bring the leading edges and trailing edges of the two blade halves into engagement for adhesive bonding. Disposed within the blade is a shear web(s) 20 which provides structural rigidity to the blade. Given the size and weight of the blade, typically at least two separate devices are required to handle and support the blade—i.e. a root ring saddle and a tip clamp. Each of these devices has a distinct geometry and has limited, dedicated locations for engaging the blade (e.g. the root saddle radius of curvature prohibits that device from engaging the, differently-shaped tip).

Figure 3:
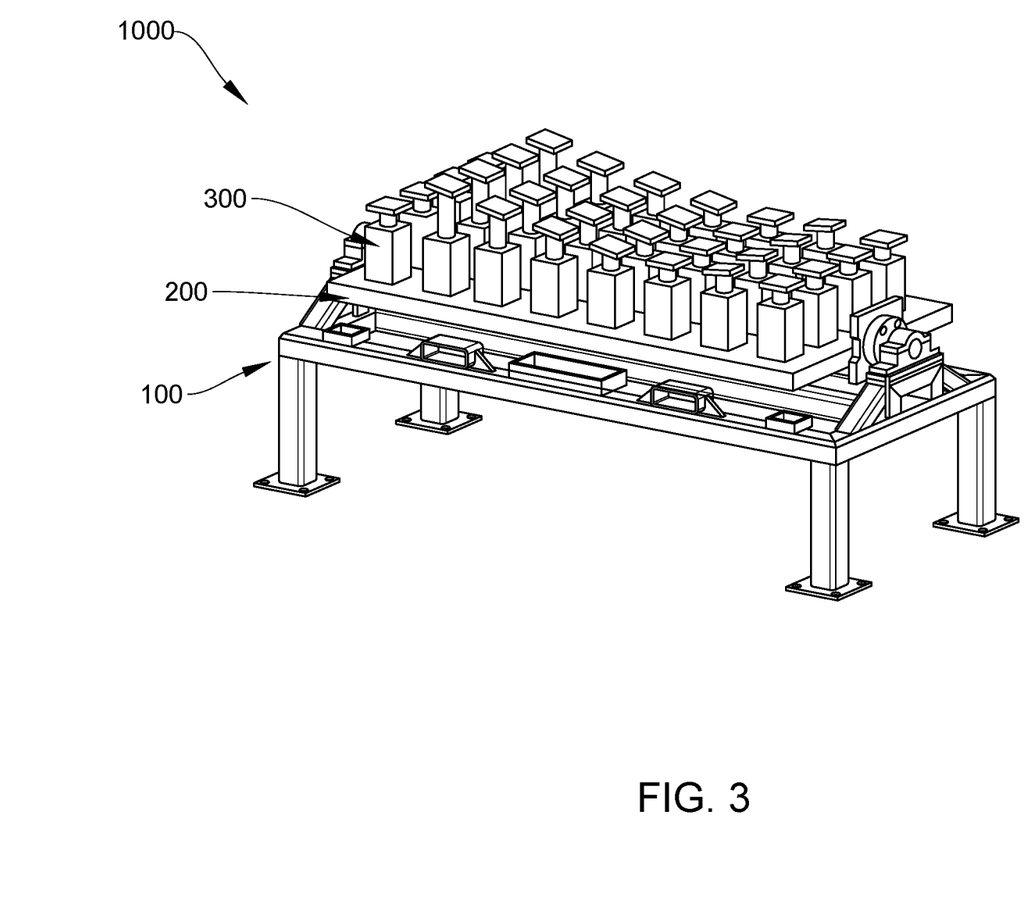
FIG. 3 is a schematic representation of a universal support for a wind turbine blade in accordance with the disclosed subject matter.

As shown in FIG. 3, the system 100 disclosed herein for handling and supporting the blade generally includes frame 100, a base plate 200, and a plurality of support members 300.

Frame 100

Figure 5:
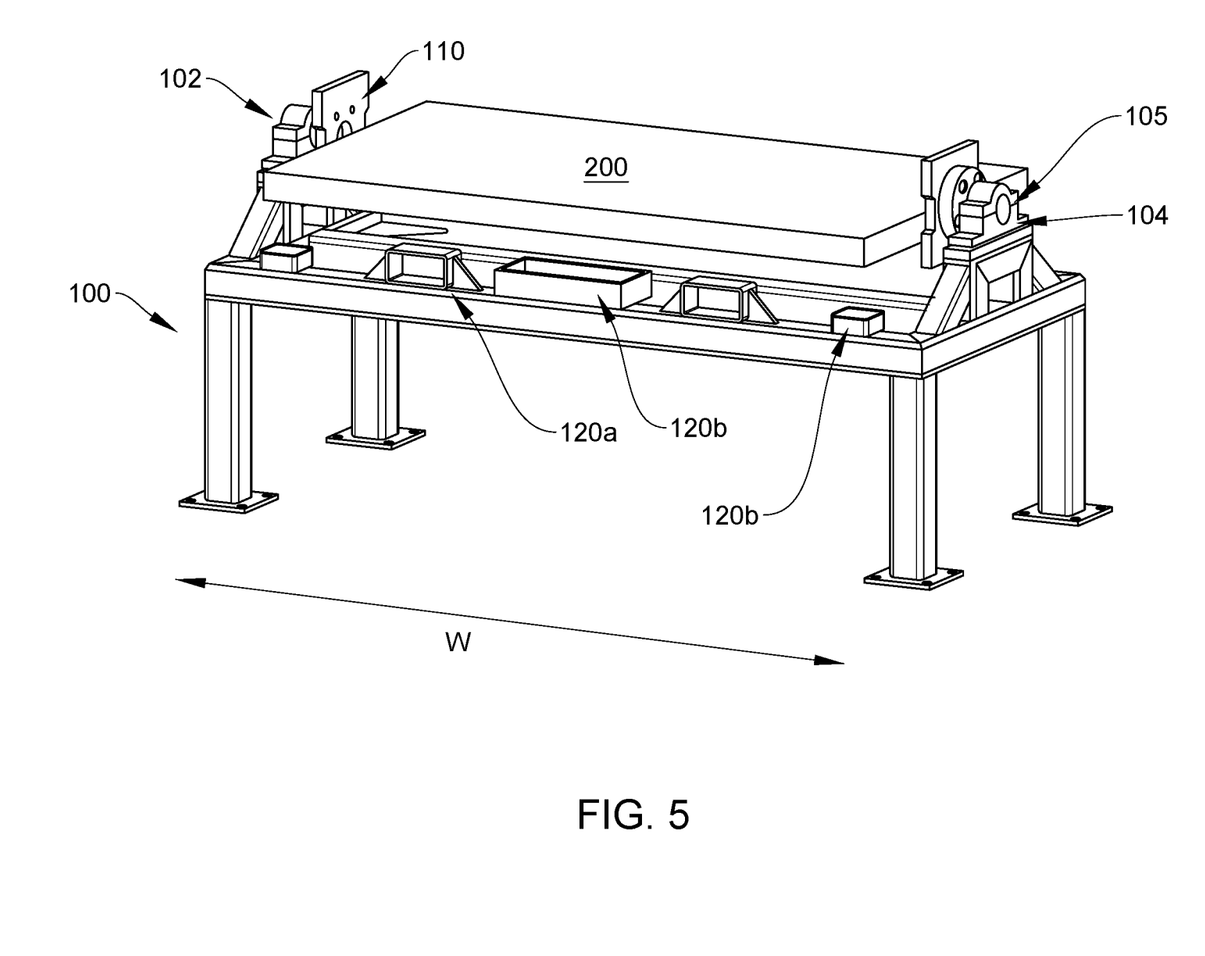
FIG. 5 is a view of the apparatus of FIG. 3, with the adjustable support members omitted to depict the support frame.

In the exemplary embodiment shown in FIGS. 3 and 5, the frame 100 has a rectangular shape with four downwardly extending legs. The frame can be formed from a plurality of individual struts or beams of any suitably rigid material (e.g. steel) capable of supporting the weight of the blade that are joined, e.g. welded, together to provide a weight bearing structure. The legs can include feet, as shown with anti-skid pads to prevent displacement of the frame 100. In some embodiments, the legs can include removable, and/or lockable, casters to allow the apparatus to be repositioned as desired without requiring lifting of the apparatus. Additionally, the legs can be of a fixed length (as shown), or adjustable (e.g. telescoping) to adjust the height of the blade and ensure sufficient clearance between the blade bottom and the shop floor.

In the embodiment shown, the frame 100 has a width "W" that is equal to, or greater, than the chord of the blade(s) to be disposed thereon. Thus, a blade can be positioned on the support with its upper surface, and in some embodiments the leading and/or trailing edges of the blade, free from contact with the support. Also, the frame can include an upwardly extending truss 102, 104 at the lateral sides. These trusses 102, 104 can receive a bracket 110 which is coupled to the base plate 200. The trusses 102, 104 extend vertically upward from the top of frame 100 to create a gap or space between the base plate 200 and the underlying frame 100. In some embodiments, the union of the bracket 110 and trusses 102, 104 includes a pin or bearing 105 that allows the bracket (and attached base plate 200) to rotate relative to the frame 100 about a longitudinal axis extending through the pin 105. For example, the pitch of the base plate 200 can adjusted in the longitudinal direction of the blade (which is to be positioned thereon) and thus allow for raising/lowering the root and/or tip as desired—without employing any equipment that directly engages the root or tip, nor any equipment above the blade (e.g. pulleys or cables).

The frame 100 also includes attachment structures 120, e.g. hoist sleeves, to receive tines for a forklift or other lifting mechanism (to allow the forklift to lift the entire frame, with or without a blade disposed thereon). These attachment structures can be configured as sleeves having linear walls as shown or non-linear attachment structures (e.g. round eyelets). Also a first set of attachment structures 120a can be oriented with their opening facing forward/back, or towards the root/tip), while a second set of attachment structures 120b can be oriented with their opening facing upward/downward (to allow pulleys/cables to be inserted therethrough to lift the entire frame, with or without a blade disposed thereon). The presence of both orientations is advantageous in that it allows for the frame to be hoisted and maneuvered from a variety of external equipment (forklifts, overhead crane, etc.).

Base Plate 200

In the exemplary embodiment shown, the base plate 200 is a rectangular plate that has a smaller width than the frame 100. The base plate 200 can be attached at a midpoint on each lateral side to the bracket 110, thereby coupling the base plate to the frame 100. Similar to the frame described above, the base plate 200 can be formed from a variety of suitably rigid materials (e.g. steel) capable of supporting the weight of the blade.

The base plate 200 can include a plurality of discrete cells (e.g. recesses with downwardly extending sidewalls) with each cell configured to receive a support member 300. Each cell can be positioned a fixed distance from adjacent cells and/or support members. Alternatively, the cells can be positioned in a pattern, e.g. greater concentration at a first side of the plate 200 than a second side. For instance, a greater number of cells can be clustered along the side of the base plate 200 that coincides with the blade trailing edge location than the leading edge, or vice versa. In embodiments in which the support members 300 are permanently attached to the base plate 200, the support members can be formed integrally with the base plate, or fixedly (e.g. welded) thereto. In embodiments in which the support members 300 are removably attached to the base plate 200 (e.g. mechanical coupling via tongue/grove or magnetically coupled; or magnetic bond between magnet in support member 300 and magnetic base plate 200).

Additionally or alternatively, in some embodiments the base plate 200 can include a series of parallel tracks (e.g. recessed from the top surface of the plate 200), with the support members slidingly positioned therein and moveable to reconfigure the arrangement or concentration of support members 300 as desired. This allows for the support members to be moved or shifted, e.g. from the tip portion closer to the root portion of the blade which is heavier and thus requires additional supports 300. The same support member can then be reconfigured to adjust the location of support members 300 to accommodate a different blade, or even the same blade if repositioned on the support member (e.g. blade is removed/replaced in a different root/tip orientation).

Support Members 300

Figure 4:
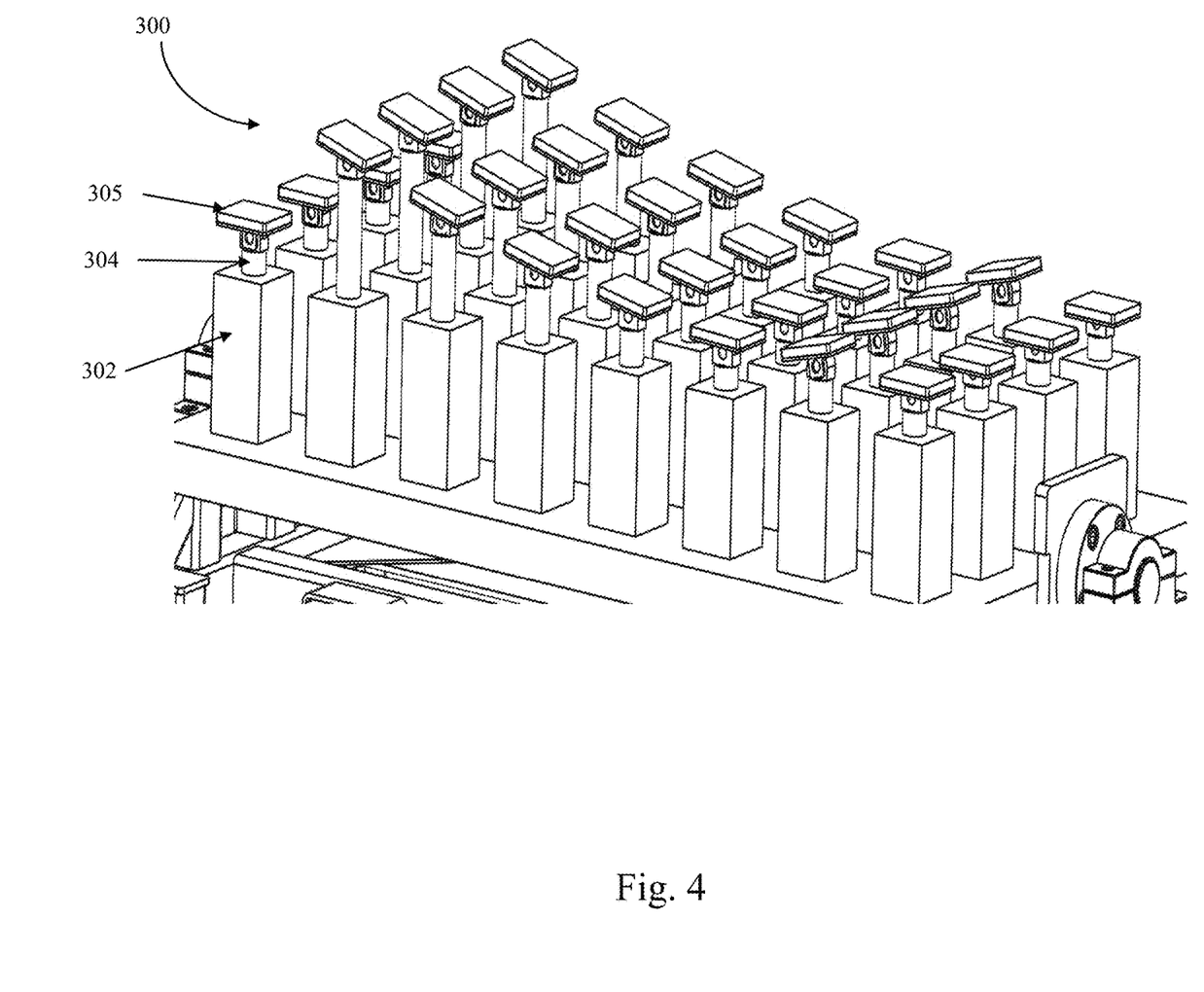
FIG. 4 is an enlarged, zoom-in view of the apparatus of FIG. 3.
Figure 6:
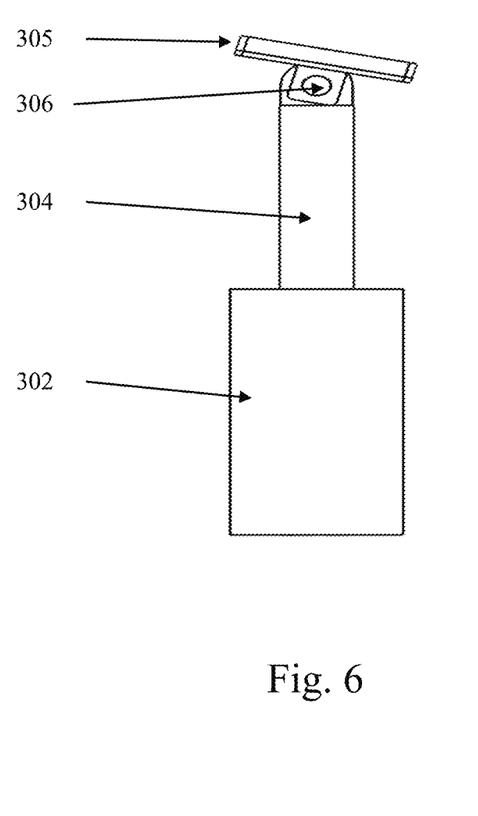
FIG. 6 is a front view of an isolated adjustable support shown in the apparatus of FIG. 3.
Figure 7:
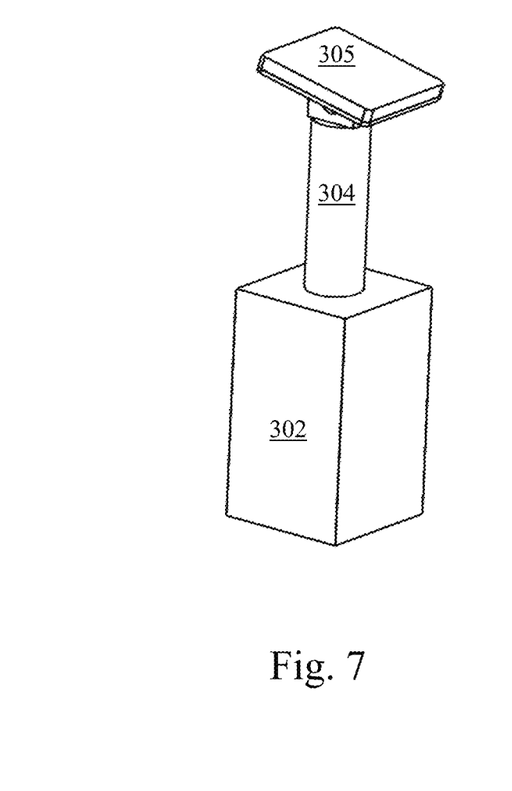
FIG. 7 is a perspective view of an isolated adjustable support shown in the apparatus of FIG. 3.

In accordance with an aspect of the disclosure, a plurality of support members 300 can be provided to engage the blade. As shown in the exemplary embodiment, the support members can be a plurality of discrete, upwardly extending members including a pillar 302, shaft 304, and pad 305, as shown in FIGS. 4, and 6-7. The height of the support members 300 can be adjustable, e.g. shaft 304 can be extended/retraced within the pillar 302. Thus, in some embodiments, the pillar 302 is equal to or greater in height than the shaft 304. Additionally or alternatively, the shafts 304 can be rotated, 360 degrees about their vertical/longitudinal axes, within the pillars 302. The pillars 302 can be a variety of shapes, e.g. rectangular, cylindrical, etc. and sized to receive the shaft 304 therein, as well as any fluid chamber(s) contained therein to effect the actuation/extension of the shafts 304, which movement can be actuated pneumatically or hydraulically. For example, power (electrical/hydraulic/pneumatic) lines can be routed through the base plate 200 to each, or select, support members pillars 302 to provide an actuation force. The shafts 304 can be operated in concert with adjacent shafts, or independently with each shaft extending to a distinct height. This operation can be done with all shafts moving simultaneously, or conversely, with only select shafts 304 moving at a time.

The pads 305 can be pivotably attached to the shafts 304, via a pin or bearing 306 coupling, so that the pads 305 can be articulated 180 degrees, traversing an arc relative to the lateral sides of the base 200 (from leading edge to trailing edge of the blade). In other words, the pitch of the pads is adjustable; the pads 305 can be rotated from a vertically oriented and right-facing position, through a horizontal upward-facing position, to an opposing vertically oriented left-facing position. Also, the pads can be locked in place at any location within the aforementioned range of movement. The pads 305 can include a cushioning material (e.g. foam, rubber) on the upper surface to avoid damage when engaging the blade.

Furthermore, the pads 305 and shafts 304 can serve as a shock absorber or dampening mechanism which deflect, temporarily, when a blade is deposited on the support members. The apparatus can include a memory which records a preset height of shafts 304, and then gradually returns the shaft 304 to that preset height after the initial deflection due to impact of the blade. Furthermore, the pads 305 can be removable so as to be replaced with pads of a different geometry/material construction as desired to accommodate a variety of blade types. Also, the support members 300 can be actuated, each independently, after a blade is placed thereon, to reposition the blade (e.g. to a desired height or pitch) to allow for post forming processing (e.g. sanding, painting, etc.).

As shown in FIG. 4, the support elements can be operated in concert with each other, to their respective predetermined displacement heights, to form a (discontinuous) receiving surface that compliments the contour of the particular blade that will be deposited thereon. The spacing of the pads 305 creates gaps so that the bottom of the blade has exposed surface area, which allows for finishing treatment (e.g. sanding, painting, etc.) of the blade skin on the exposed surface area(s).

The support members 300 can be evenly spaced about the base plate 200, or distributed in a pattern of varied density.

For example, a greater number of support members 300 can be positioned in a cluster on the base plate 200 which correspond to heavier portions of the blade. Additionally or alternatively, the support members can be reconfigured or moved about the base plate as needed to accommodate different blade designs. In some embodiments, the support members are detachable from the base plate 200 (e.g. ejected from the cells within the base plate 200). In some embodiments, the support members 300 are permanently coupled to the base plate 200, but permitted to move or slide within the tracks of the base plate so as to slide from one cell to another (akin to rook movement on a chess board). This allows the support members 300 to be relocated or moved out of the way in the event access to the skin surface on the bottom of the blade (i.e. the portion in contact with the apparatus) is desired (e.g. sanding, painting, etc.).

Figure 8:
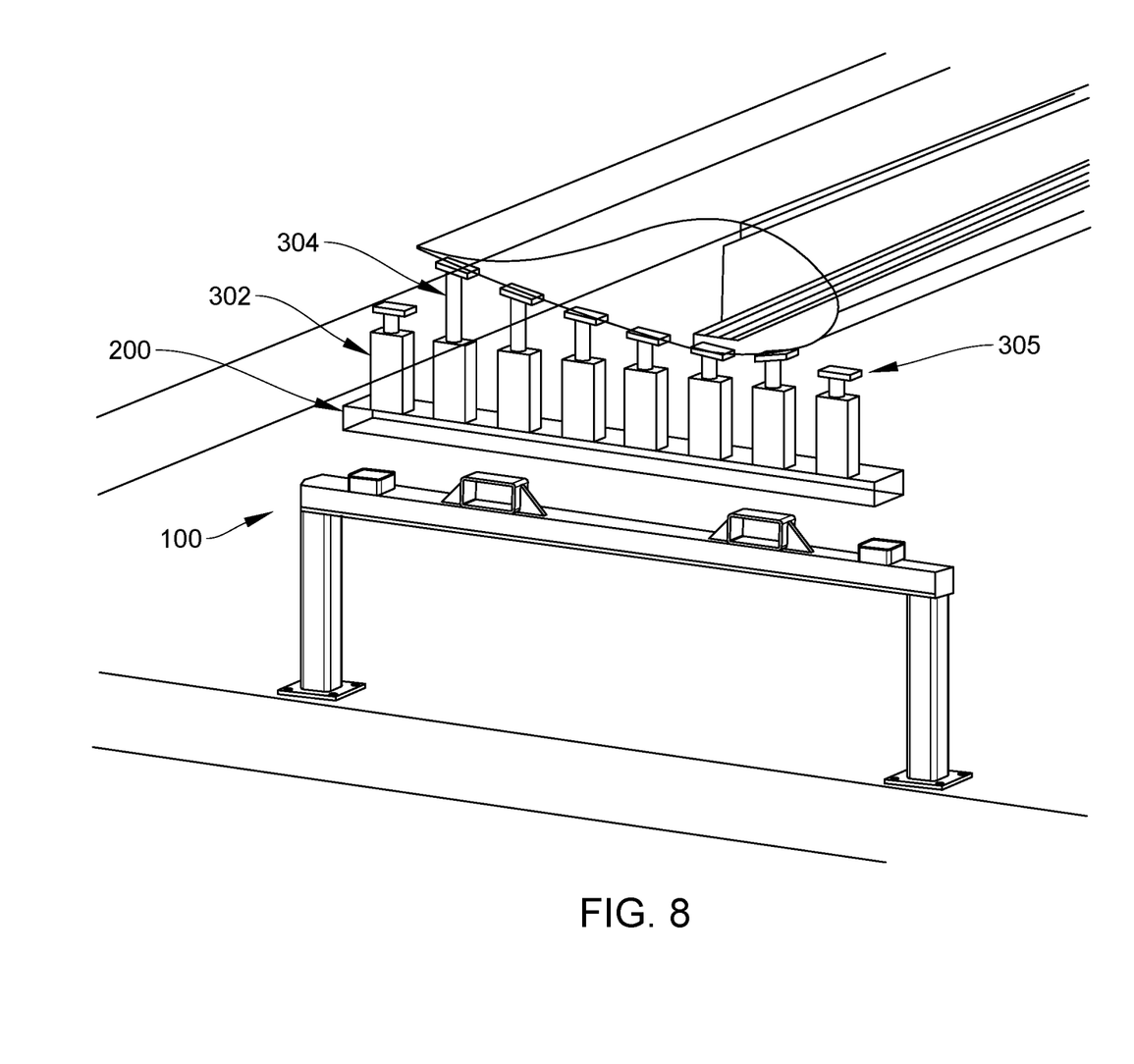
FIG. 8 is a schematic representation of the universal support of FIG. 3, with a partial blade disposed on the support.

In accordance with another aspect of the disclosure, the universal support apparatus disclosed herein can be programmable to a plurality of preset configurations (stored in memory in a CPU located within the frame 100 or external) that correspond to various blade types/sizes. Each support member can be operated to adjust their respective orientations independently. Additionally, the support members 300 can operate to adjust their respective orientations simultaneously. In some embodiments all support members 300 are originally positioned in the fully retracted position, then a blade is placed on the apparatus, with the support members 300 then being actuated to displace (i.e. extend) to their pre-assigned height for that particular blade type. Alternatively, the support members 300 can each be displaced to their predetermined height, then the blade is deposited on the apparatus. In some embodiments, the pad 305 of every support element engages the surface of the blade; in some embodiments less than all pads 305 engage the surface of the blade, as shown in FIG. 8. Accordingly, the blade can be rotated or pitched upward at the trailing edge and downward at the leading edge, as shown (with the upper surface of the blade, as well as the leading and trailing edges remaining exposed and free from contact with any equipment). This repositioning of the blade allows for further treatment/processing of the blade without cumbersome equipment, nor risk of injury to technicians.

Figure 9:
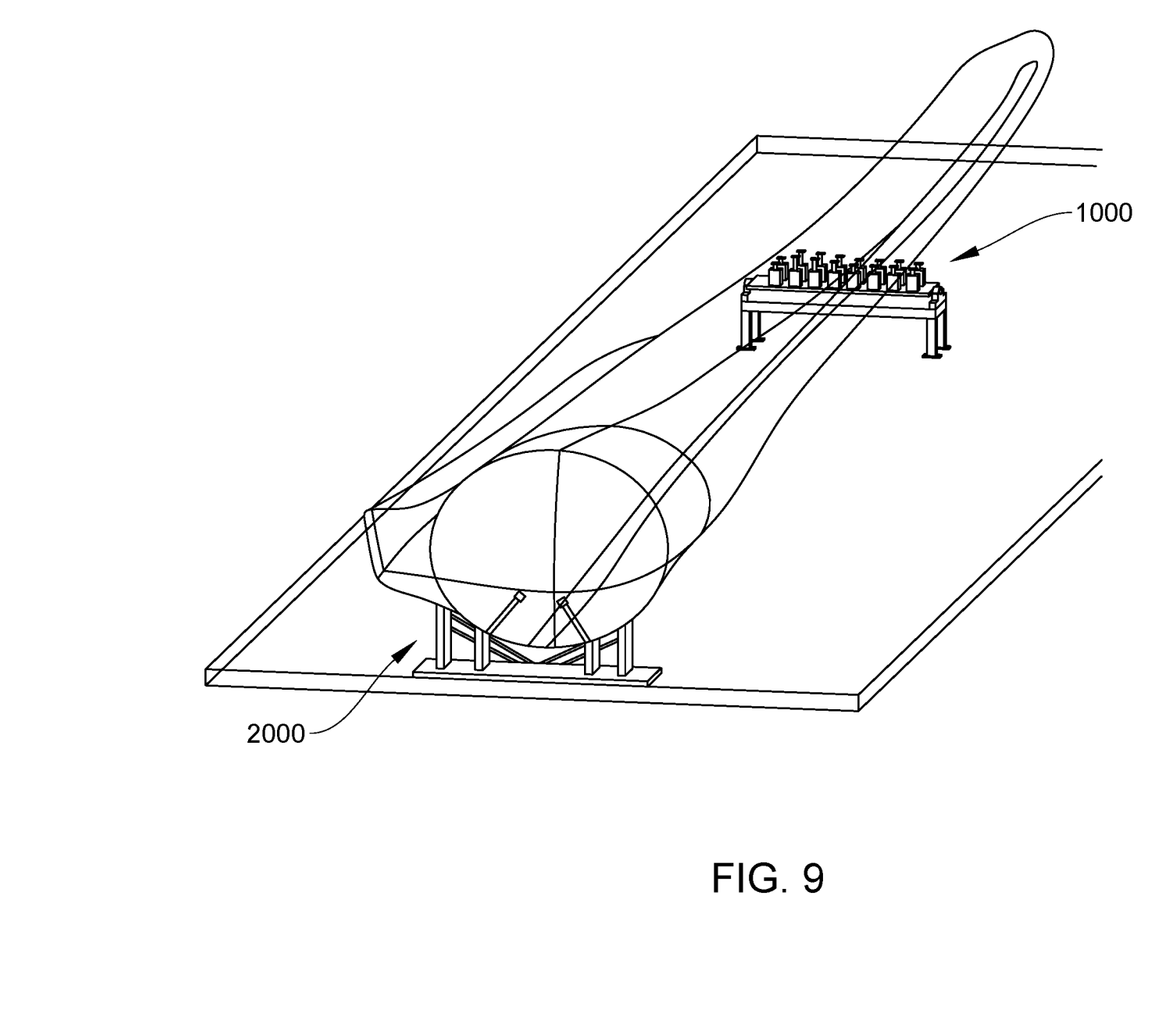
FIG. 9 is a schematic representation of the universal support of FIG. 3, with a blade disposed on the support.

In some embodiments, a root handling apparatus (e.g. root saddle) 2000 can be employed in tandem with the apparatus 1000 disclosed herein, as shown in FIG. 9. Here the root is clamped in a fixed position while the universal supporting apparatus 1000 is positioned, at any desired location from the root to the tip. In other words, because the universal supporting apparatus 1000 only engages the blade from the bottom surface (e.g. does not include a ring or clamp that extends around the leading or trailing edges to engage the upper blade surface), and has virtually infinite flexibility in the contour that the support members 300 can achieve in the aggregate, the apparatus 1000 can be positioned at any blade location irrespective of the blade contour at that location.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A wind turbine blade handling apparatus comprising:
    a frame, the frame including at least one beam and a plurality of downwardly extending legs,
    the frame having at least one attachment structure with linear walls defining an opening oriented horizontally and configured to receive a tine of a forklift to lift the wind turbine handling apparatus;
    the frame having at least one attachment with linear walls defining an opening oriented vertically to receive a pulley to lift the wind turbine handling apparatus;
    a truss extending vertically upward from the frame;
    at least one bracket rotatably coupled to the truss;
    a base plate, the base plate having a generally rectangular shape with a width smaller than a width of the frame, and coupled to the at least one bracket at a midpoint of the base plate along opposing sides, the at least one bracket disposed between the truss and the base plate, and wherein the base plate and the at least one bracket configured to rotate relative to the frame;
    a plurality of adjustable support members disposed on the base plate;
    each support member having:
    a pillar, the pillar having a top surface and a bottom surface, with the bottom surface coupled to the base plate
    a moveable shaft, the shaft having a first end and a second end, with the first end disposed at least partially within the pillar and the second end disposed above the top surface of the pillar, and
    a moveable pad, the pad pivotably coupled to the second end of the shaft via a pin, wherein the moveable pad is configured to pivot about an axis of the pin; and
    wherein at least one of the plurality of adjustable support members are moveable relative to the base plate to reconfigure an arrangement of adjustable support members.

2. The apparatus of claim 1, wherein for each of the plurality of support members, the shaft can be extended and retracted relative to the pillar.

3. The apparatus of claim 1, wherein for each of the plurality of support members, the shaft can rotate about a vertical axis.

4. The apparatus of claim 1, wherein for each of the plurality of support members, the pad is pivotably attached to the shaft with the pin.

5. The apparatus of claim 4, wherein for each of the plurality of support members, the pad can rotate about the axis of the pin.

6. The apparatus of claim 1, wherein each support member is spaced apart with a fixed distance between each support.

7. The apparatus of claim 1, wherein each support member is positioned on the base plate with a variable distance between each support.

8. The apparatus of claim 1, wherein for each of the plurality of support members, the pillar is a rectangular column, the shaft is a cylindrical rod telescopingly received within the pillar, and the pad is a rectangular structure oriented perpendicularly to the shaft.

9. The apparatus of claim 1, wherein each support member is independently adjustable.

10. The apparatus of claim 1, wherein each support member is adjustable via pneumatic power.

11. An automatically adjustable wind turbine blade handling apparatus comprising:
- a frame, the frame including at least one beam and a plurality of downwardly extending legs, the frame including an upwardly extending truss at a lateral side of the frame, the frame having at least one attachment structure configured as an eyelet defining an opening to receive a pulley to lift the wind turbine handling apparatus;
- at least one bracket rotatably coupled to the truss;
- a base plate, the base plate having a generally rectangular shape and coupled to the at least one bracket at a midpoint of the base plate along opposing sides and the at least one bracket disposed between the truss and the base plate;
- a plurality of adjustable support members disposed on the base plate;
- each support member having:
- a pillar, the pillar having a top surface and a bottom surface, with the bottom surface coupled to the base plate
- a moveable shaft, the shaft having a first end and a second end, with the first end disposed at least partially within the pillar and the second end disposed above the top surface of the pillar, and
- a moveable pad, the pad having one axis of rotation relative to the moveable shaft, the pad pivotably coupled to the second end of the shaft via a pin, wherein the moveable pad is configured to pivot about an axis of the pin;
- wherein a plurality of support members are automatically adjustable to position the pad at predetermined heights; and
- wherein at least one of the plurality of adjustable support members are moveable relative to the base plate to reconfigure the at least one of the plurality of adjustable support members.

12. The apparatus of claim 11, wherein the plurality of support members are automatically adjustable to position the pad at predetermined pitch angle.

13. The apparatus of claim 11, wherein the predetermined height of a first of the pads is different than the predetermined height of an adjacent one of the pads.

14. The apparatus of claim 11, wherein the plurality of pads are positioned relative each other to compliment the contour of a wind turbine blade surface.

15. The apparatus of claim 11, wherein each support is spaced apart with a fixed distance between each support.

16. The apparatus of claim 11, wherein for each of the plurality of support members, the pillar is a rectangular column, the shaft is a cylindrical rod telescopingly received within the pillar, and a bottom surface of the pad is a rectangular structure oriented perpendicularly to the shaft.

17. The apparatus of claim 11, wherein each support member is independently adjustable.

18. The apparatus of claim 11, wherein each support member is adjustable via pneumatic power.

19. The apparatus of claim 11, wherein for each of the plurality of support members, the pillar has a height equal to or greater than the height of the shaft.

20. The apparatus of claim 11, wherein the frame has a rectangular upper surface, and the trusses extend vertically upward from a top of the frame to create a space between the base plate and the underlying frame.

* * * * *